Oct. 19, 1937.                H. W. ALDEN                    2,096,530
                    MULTIWHEEL SUSPENSION FOR VEHICLES
                           Filed Feb. 8, 1935
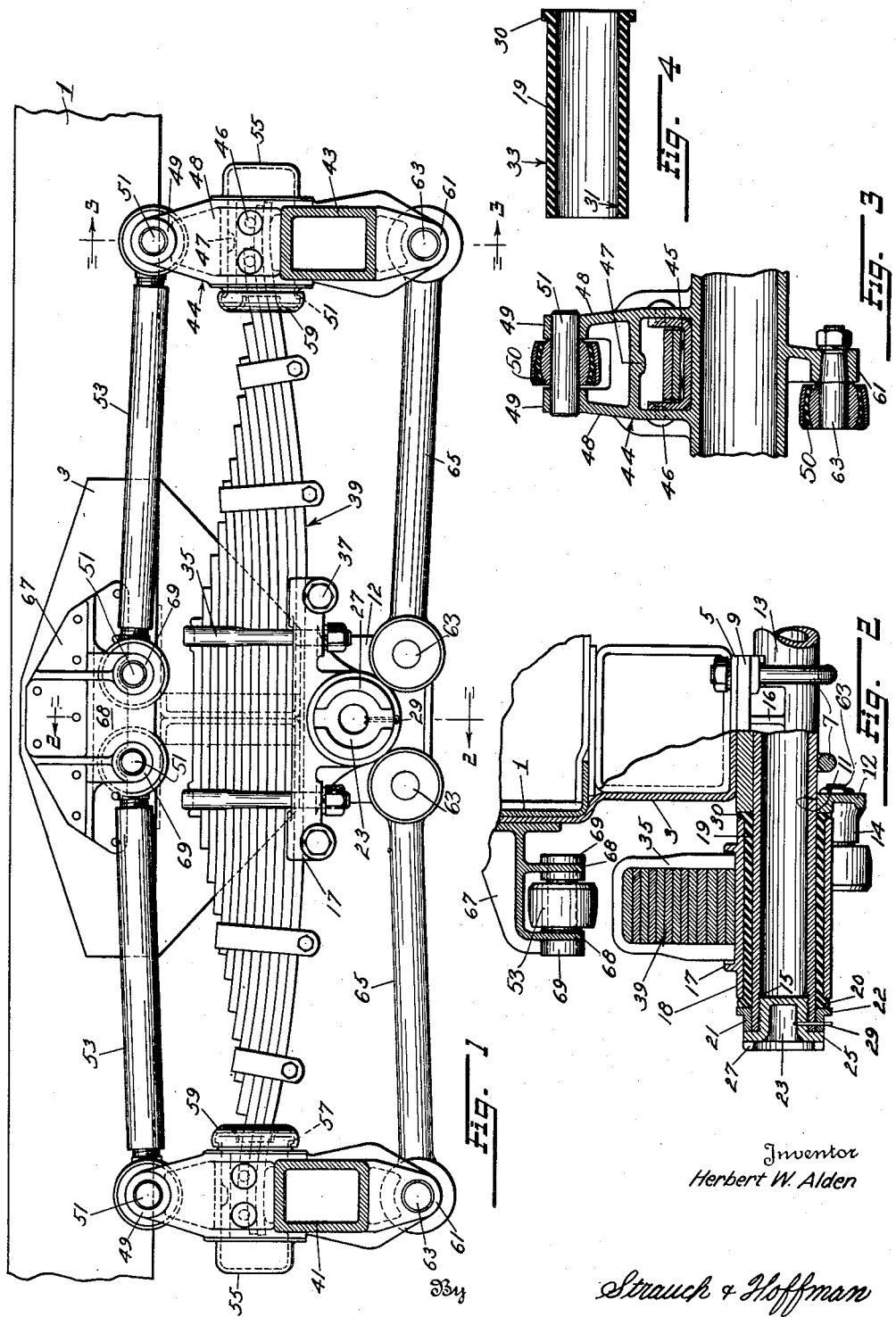
Inventor
Herbert W. Alden
By
Strauch & Hoffman
Attorneys Patented Oct. 19, 1937

2,096,530

UNITED STATES PATENT OFFICE 2,096,530

MULTIWHEEL SUSPENSION FOR VEHICLES

Herbert W. Alden, Detroit, Mich., assignor to The Timken-Detroit Axle Company, Detroit, Mich., a corporation of Ohio Application February 8, 1935, Serial No. 5,647

5 Claims. (Cl. 280—124)

This invention relates to improvements in multi-wheel suspensions for vehicles.

The present invention is especially concerned with improved suspension for multi-wheel road vehicles of the type embodying load equalizing springs and torque neutralizing devices connected between the vehicle frame and the tandem wheels of the vehicle and is an improvement on the construction disclosed in my aplication, Serial No. 711,423, filed February 15, 1934 for "Suspensions For Multi-Wheelers", which in turn represented an improvement over the construction illustrated in Buckendale patent No. 1,946,060.

In some of the suspension systems of the prior art embodying a leaf spring and a torque neutralizing device, the construction has been such as to utilize the springs to prevent excessive axial movement of the axles laterally of the vehicle frame. Such use of the springs has been seriously hampered by the use of metallic bearings in the fulcrum of the spring seat, which require for efficient operation, periodic lubrication. If they are not periodically lubricated, such bearings wear and this wear plus the clearance necessarily allowed in manufacture, produces excessive clearance and a loose fit between the spring seat and the tubular trunnion member. This excessive clearance is magnified, due to the leverage ratio, at the connection between the spring ends and the axles, so that even though the spring seat is of such design as to clamp the spring rigidly, excessive lateral movement of the axles is not prevented.

Worn spring seat bushings or connections permit misalignment in the tracking of the tires of the rear axle of a multi-wheel unit with the tires of the forward axle. In other words, in operation, the rearmost axle of a multi-wheel unit under such conditions may weave laterally with respect to the forward axle. Such weaving action is conducive to further wear and ultimately results in failure of the mechanism. Such weaving also causes lateral jerking of the vehicle, which in turn causes the load to shift.

Shocks encountered by a vehicle in traveling over uneven ground also cause wear in metal connections, as well as contribute to rough riding. Under many conditions of use, dirt and grit obtain access to clearances and spaces between relatively movable parts to cause excessive wear and friction, and other undesirable results.

It is the primary object of the present invention to remedy the above mentioned defects and disadvantages without the addition of cumbersome or expensive auxiliary equipment to the vehicle or the multi-wheel suspension.

My invention contemplates the use of a sleeve of resilient material interposed between a spring seat and a pivotal support for the latter; and it is one of the major objects of this invention to provide, in a multi-wheel mechanism, a spring seat bushing or bearing which will allow proper flexibility and yet will maintain the forward and rearward axles of the unit in correct alignment.

It is a further object to provide a resilient spring seat bearing which will allow sufficient lateral movement of the axles of a multi-wheel unit of the type above mentioned, so that no undue strains or stresses are set up therein and yet when the impulse which causes such lateral movement has disappeared, said bushing will cause the mechanism to realign itself.

A further object is to provide a resilient trunnion tube and spring seat bearing which is preloaded to withstand the contemplated shock loads to which the multi-wheel vehicle is expected to be put.

A further primary object of this invention is to provide a multi-wheel unit for a vehicle, all parts of which are completely insulated from the frame of the vehicle by means of a resilient material.

It is also an object of my invention to devise an improved, and particularly a sealed connection between a spring end and the axle that supports the latter.

The above and further objects will appear from the following description when taken in connection with the annexed drawing wherein Figure 1 is a side view in elevation of a tandem axle arrangement comprising my invention, Figure 2 is a partial sectional view taken substantially upon the line 2—2 of Figure 1, Figure 3 is a partial sectional view taken substantially on the line 3—3 of Figure 1, and Figure 4 is a longitudinal sectional view of the spring seat resilient bearing of Figure 2 in its free or normal shape prior to its incorporation in the assembly.

It is noted that only one side of a multi-wheel mechanism is shown, but it is understood that a four-wheel unit is intended and that the other side (not shown) is identical with the side shown.

Referring now to the drawing wherein like reference characters refer to like parts wherever they occur, numeral 1 indicates one of the side members of a vehicle frame and the numeral 3 indicates a bracket suitably secured to the frame and which depends therefrom and terminates in a horizontal rectangular portion 5 at its lower extremity. Attached to said portion 5 by suitable means, such as U-bolts 7 is a seat or bracket 9. Said bracket has at its top a platform throughout its length, which is designed to register with rectangular portion 5. Extending downwardly from the outer end of the platform and integral therewith is a wall 12 apertured at 11 and provided with two symmetrically-spaced integral hollow bosses 14, the construction and purpose of which will be described hereinafter.

The remainder of the bracket under the flat portion 5 is semi-circular and is provided with suitable strengthening ribs 16. Clamped with the bracket 9 to the rectangular portion 5 and extending through the aperture 11 is a center trunnion tube 13. Said tube extends beyond wall 12 for a considerable distance and is interiorly threaded at its outer end as at 15.

A spring seat 17 is provided adjacent the bracket 9. Depending from said spring seat is an elongated hollow boss 18 adapted to receive the trunnion tube 13. Inserted and clamped between said boss and tube is a sleeve 19 of rubber or other resilient material.

Spring seat 17 is spaced axially from bracket 9 by a collar of rubber 30 integral with the main sleeve 19. Adjacent the outer side of spring seat 17, and also spaced therefrom by means of a collar of rubber 20 integral with sleeve 19, is a metal collar 21 which slidingly fits upon the outer end of tube 13 and which has an external flange 22 abutting the outer end of the rubber sleeve. A clamping cap 23 is screw-threadedly inserted into threads 15 of tube 13 and is provided with an annular flange portion 25 which abuts both the end of tube 13 and collar 21. Notches 27 are provided in said clamping cap so that it may be forcedly rotated with a suitable tool. Collar 21 is provided with a small radial hole so that when clamping cap 23 is assembled in the position shown in Figure 2, a hole may be drilled, using the radial hole in collar 21 as a pilot, through tube 13 and cap 23 and a cotter pin 29 inserted therethrough and the mechanism thus permanently locked in position.

As seen in Figure 4, the resilient sleeve 19, before assembly, is simply an elongated cylindrical rubber sleeve (assuming rubber to be the material used) having at one end thereof a short portion 30 of increased outside diameter. The inside diameter 31 is substantially the same size as the outside diameter of the tube 13, and the outside diameter 33 is substantially the same as the inside diameter of the hollow boss 18 of spring seat 17. It is thus seen that no assembly difficulties can arise, for the sleeve is readily slidable onto tube 13 and into spring seat 17. Sleeve 19 may be assembled dry, or a suitable lubricant may be used, depending upon conditions, to facilitate assembly. The loading of the sleeve is accomplished entirely by screwing clamping cap 23 into threads 15. Due to the incompressible characteristics of rubber, as cap 23 is screwed into threads 15, the sleeve 19 will flow as a liquid into the deformed shape that it assumes in Figure 2, entirely filling all air spaces and in addition, will try to escape from the confining region. This latter tendency accounts for the before-mentioned end collars 20 and 30. Collar 21 is provided so that there is no tendency to rotate the outer portion of the sleeve 19 during assembly.

When the length of trunnion is such that difficulty would be encountered in obtaining uniform loading of the sleeve throughout its length, two or more sleeves may be used, separating each sleeve from the other by means of a metallic spacer of small width.

The length of the sleeve 19 in its free state is so calculated that when assembled in the position shown in Figure 2, just the right amount of loading will be had to cause sufficient cohesion to create considerable resistance to the forces tending to rotate or twist spring seat 17 about trunnion tube 13. The rubber sleeve of course does not oscillate bodily, but yieldingly resists and dampens oscillations of the spring seat through internal deformation. It will be noted that, given a sleeve of calculated length as just mentioned, the correct amount of resistance is always exactly obtained by screwing the cap 23 inwardly until it abuts the end of the cross trunnion 13, and that this accurate adjustment is maintained by the pin 29.

Resting upon the spring seat 17 and clamped thereto substantially midway of its ends by means of spring clips 35 and bolts 37 in a manner more fully set forth in my aforesaid application, Serial No. 711,423, is a load supporting spring 39. The ends of spring 39 are supported by load carrying axles 41 and 43 in a manner described below. One or both of said axles may be driving axles, or they may be trailing axles, depending upon the variety desired. On the upper side of each outer portion of each axle and integral therewith is a structure 44, the lower portion of which is of hollow rectangular section. A spring end retaining member 45 of U-section, is secured within said rectangular section by suitable means such as rivets 46.

The ends of spring 39 rest upon the lower sides of the members 45, said lower sides being convexly-shaped in part to permit relative rocking movement of the spring and axles without causing undue strains or stresses. For this same reason a very small clearance is provided between the side walls of members 45 and the spring. The function of members 45 is to eliminate wear on the axle due to movement of the spring. Because of this function, said members preferably are made of a material having the same hardness as the material of the spring. However, if the material of structure 44 is made hard enough, as when a detachable bracket is used in place of structure 44, and wear becomes no longer an important factor, then, obviously, each member 45 may be eliminated.

Depending from the upper portion of each rectangular section of members 44 is an integral rebound button 47 which governs the distance that the spring ends may move upwardly out of contact with the convex portions of members 45.

The upper portion of each structure 44 comprises two upwardly extending walls 48, which in effect are continuations of the side walls of the lower rectangular section. Said walls terminate in aligned circular bosses 49 which have aligned apertures therethrough for the insertion of pins 51. Said pins support and position one end of upper torque rods 53. Said torque rod ends are preferably of the type disclosed in the copending Alden et al application, Serial No. 640,238, filed October 29, 1932, now Patent No. 1,990,016 dated Feb. 5, 1935. Suffice it to say here that such ends are provided with a resilient material such as rubber sleeve 50 as a means of allowing a limited amount of flexibility and universality while simultaneously cushioning shocks. Pins 51 are secured in bosses 49 by means of set screws or other suitable means.

The outer side of the rectangular portion of each structure 44 has secured thereto by any suitable means a cup-like closure member 55. It is obvious that said closure may be formed integral with structure 44, or in case said structure is a separate detachable bracket it may also be part of such bracket. The inner side of the rectangular portion of each structure 44 is provided with a perimetrical upturned lip 57 of sufficient internal size to permit spring flexure and desired axle movement. Said lip is provided so that the outer edge of an elastic closure or boot 59 may be stretched thereover, with the inner edge of said boot stretched over the adjacent portion of spring 39 to snugly engage the latter, thereby effecting a seal.

In some localities excessive wear occurs where the spring ends rest on the axle due to road dirt and grit getting between the spring ends and spherical seats. The closures 55 and 59, thus provided, overcome this complaint. A lip and imperforate elastic cap may be substituted for the cup 55 if desired.

Extending downwardly from the lower portion of each end portion of each axle is a wall terminating in a boss 61 which has centrally therethrough a tapered aperture for the insertion of a taper-ended pin 63. Each pin 63 is inserted into and positions one end of a lower torque rod 65. The two torque rods 65 are similar to the two upper torque rods 53 and their ends are of the same construction, including rubber sleeve 50. It is obvious that boss 61 could be provided for in a separate bracket which could be adapted to be removably secured to the axle.

Superimposed above the spring center at the upper portion of bracket 3 is a second bracket 67 provided with two outstanding walls 68 (best seen in Figure 2) each of which has two symmetrically-spaced bosses 69 therein. Inserted through aligned apertures in said bosses are pins 51 identical with pins 51 inserted through bosses 49 and said pins are adapted to retain the inner ends of the upper torque rods 53.

The before-mentioned bosses 14 of bracket 9 are constructed like bosses 61 and are provided with tapered apertures for the insertion of the tapered ends of further pins 63, like those in Figure 3. Said pins secure in position the inner ends of the lower torque rods 65.

In summation, the before-described apparatus very closely approaches a "fool proof" structure. There are no lubricating problems—exclusive of wheel bearings, brakes and driving mechanisms— involved here as the necessity for lubrication is eliminated. Each of the parts of the multi-wheel suspension is resiliently insulated from the others and the frame. The resilient material is used in such manner in each case that performance is enhanced. In addition to the elimination of lubricating difficulties, shocks to passengers or fragile goods comprising the vehicle load are decreased.

In addition, the use of a resilient material such as sleeve 19 within spring seat 17 permits—as the axles 41 and 43 move upwardly or downwardly with respect to each other—a limited axial lateral movement of the springs such as is necessary to relieve the unit from strains which would otherwise occur due to shock loads. Due to the nature of the material of said sleeve and the manner in which it is assembled, however, the axles will always resume their normal running position after such axial lateral movement has occurred.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed and desired to be secured by United States Letters Patent is:—

1. In a multi-wheel suspension unit for use in association with a set of tandem wheels at one side of a vehicle framework, a suspension beam and means for yieldingly connecting an intermediate portion of said beam to the vehicle framework, said means comprising an elongated member designed to be substantially horizontally secured to the framework, a member provided as a rigid part of said portion of the beam, said members shaped for assembly in telescoping relationship to afford a sleeve-like space therebetween, a rubber load-supporting sleeve set in deformed position in said space, the inner one of said telescoped members having an end terminating adjacent one end of the rubber sleeve and being internally threaded, and means for holding said sleeve under deformation in its assembled position, said holding means comprising an externally threaded element screwed into said internally threaded end, said element having a flange designed to force said sleeve into deformity and located to engage and stop against said inner one of the telescoped members when a predetermined deformation of the rubber sleeve is obtained.

2. In a multiwheel suspension unit for use in association with a set of tandem wheels at one side of a vehicle framework, a suspension beam, and means for yieldingly connecting an intermediate portion of said beam to the vehicle framework, said means comprising an elongated member designed to be substantially horizontally secured to the framework, a member provided as a rigid part of said portion of the beam, said members shaped for assembly in telescoping relationship to afford a sleeve-like space therebetween, a rubber load-supporting sleeve set in deformed position in said space, and means for holding said sleeve under deformation in its assembled position, one of said telescoped members being provided with means forming an abutment for the rubber sleeve adjacent one end of said sleeve-like space, and said holding means being adjustably secured to one of said members at the other end of said space to apply pressure to the other end of said sleeve.

3. In a multi-wheel vehicle having a framework and tandem axles for supporting the side portions of one end thereof, in combination with one of said side portions, a suspension to mount said portion upon said axles, said suspension comprising a trunnion element secured transversely of the framework between the axles and extending outwardly from the framework, a fixed shoulder provided around said element inwardly from its extended end, a rubber sleeve surrounding said extended end of the trunnion element and having one end abutting said shoulder, a suspension beam having a hollow boss rigidly provided thereon between its ends and having its ends closely associated with said axles for support thereby, said hollow boss snugly receiving at least a major portion of said rubber sleeve, means at the extended end of the trunnion element forcibly engaging the other end of said rubber sleeve, the extended end of said trunnion element being internally threaded, and said last-mentioned means comprising a collar slidable along said end into pressed engagement with the rubber sleeve, a rotatable member screwed into said internally threaded end and having an external flange abutting said collar, and means for locking said rotatable member and said collar in a fixed position of adjustment.

4. A multi-wheel vehicle suspension eliminating lubrication problems, said suspension comprising a longitudinal spring beam designed to be connected to the vehicle frame between its ends, means including a rubber sleeve providing an oscillation-resisting pivotal joint forming said connection, said means further constructed and arranged to yieldingly resist lateral movement of the beam from a predetermined normal position relative to the frame, devices at opposite ends of the spring beam to support the latter upon axles, said devices including means for slidably receiving said ends and sealing them from dust and grit, at least one of said devices including means for preventing excessive axial movement of an axle laterally of the frame, and elements for spacing said devices relative to said pivotal joint, said elements including rubber means for permitting flexible movement thereof when said axles move with respect to each other and the frame.

5. In a suspension unit for use in association with one side of a vehicle framework, a trunnion element designed to be secured transversely of said side of the framework, a fixed shoulder provided around said element inwardly from its outer end, a rubber sleeve closely surrounding said element and having at one end a preformed collar engageable with said shoulder, the other end of said sleeve being preformed to the same external diameter as the body of the sleeve, a suspension beam having a hollow boss rigidly provided thereon and slidable over said rubber sleeve into abutment with said preformed collar, and means at the outer end of said element to hold said boss and said sleeve in assembled position, said sleeve being of materially greater length than said boss, and said holding means being adjustable axially of said element and engageable with the outer end of said sleeve to deform the latter and produce a collar at said outer end between the boss and the holding means.

HERBERT W. ALDEN.